UNITED STATES PATENT OFFICE.

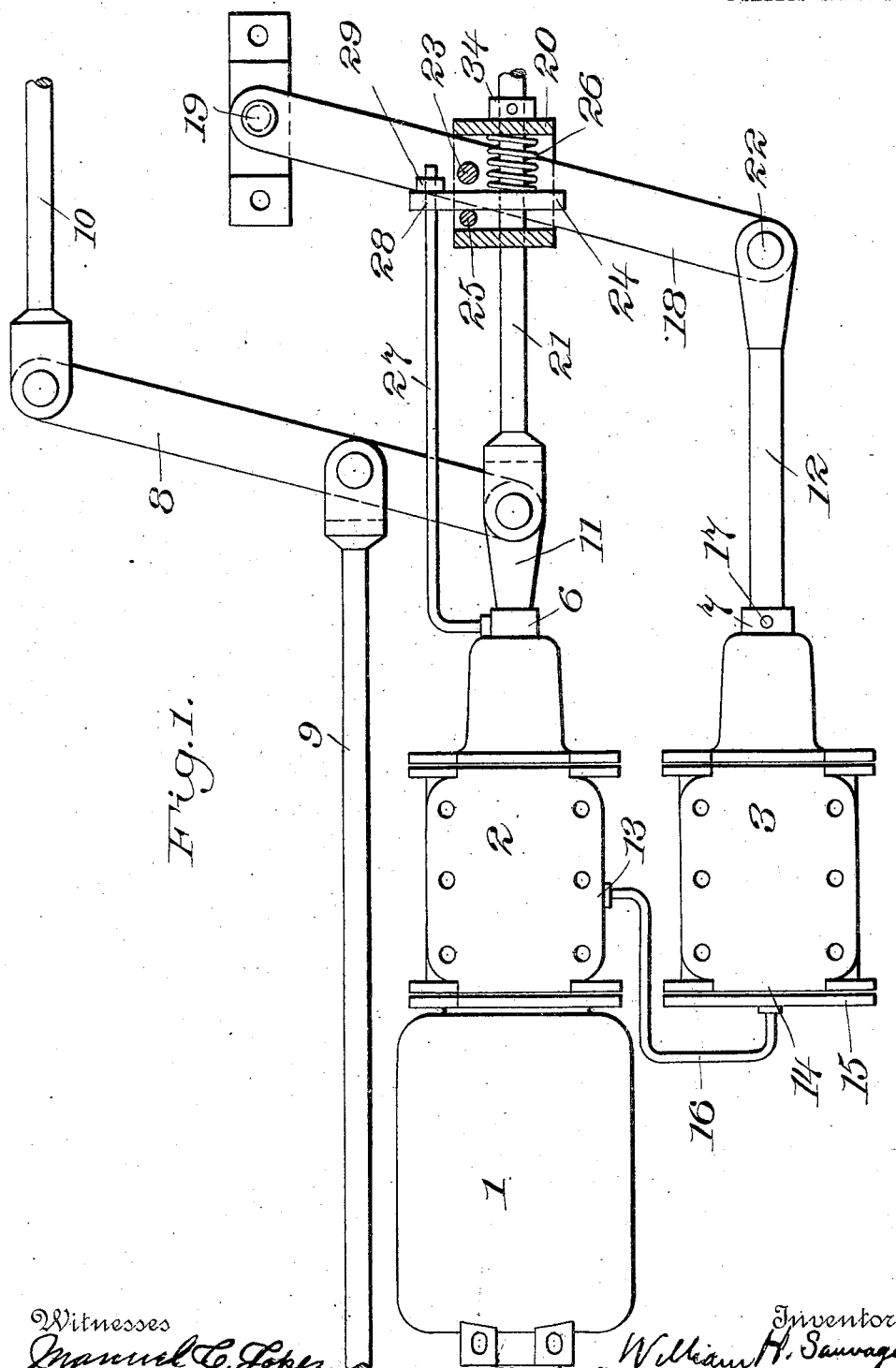

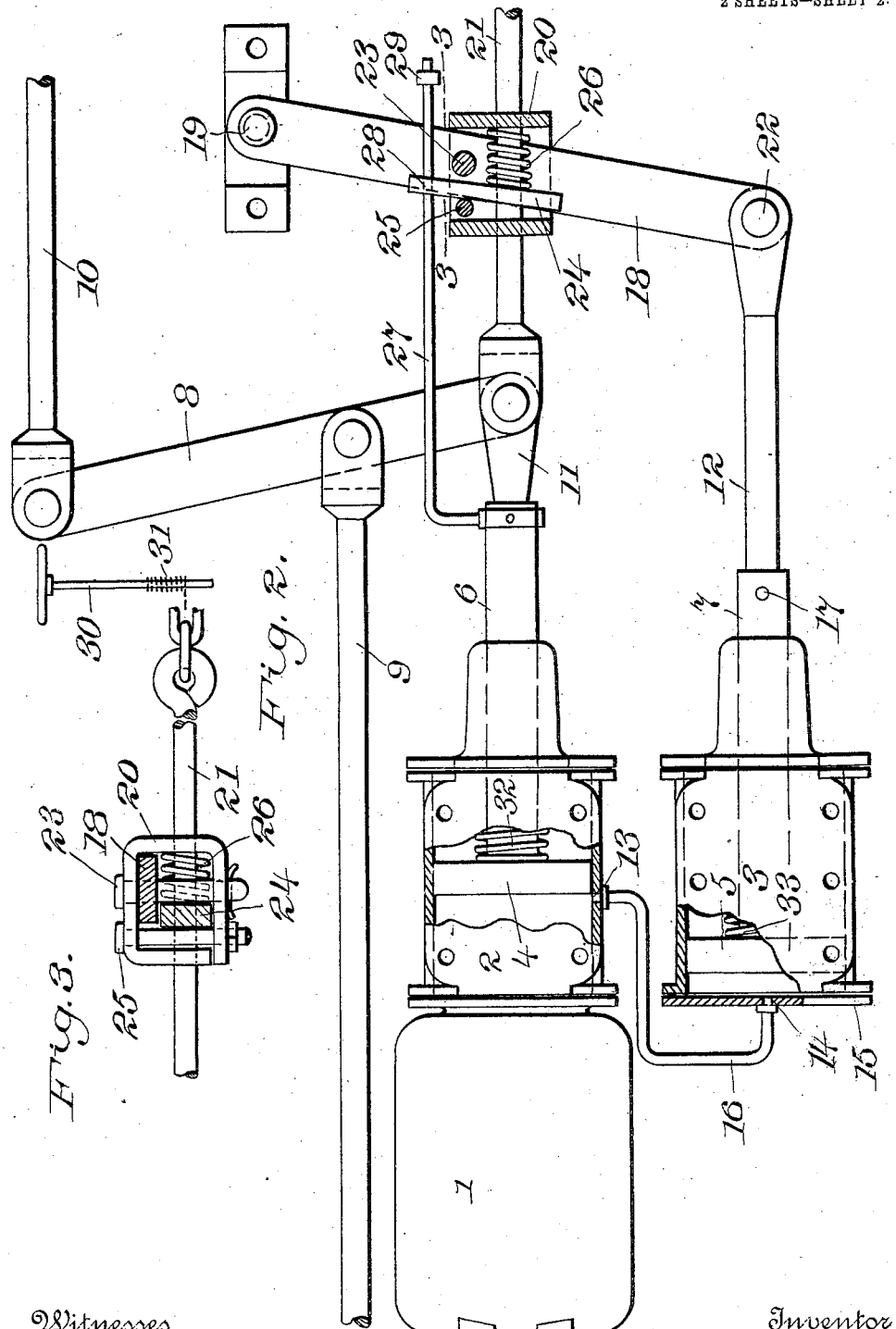

WILLIAM H. SAUVAGE, OF NEW YORK, N. Y., ASSIGNOR TO SAUVAGE SAFETY BRAKE COMPANY, A CORPORATION OF NEW JERSEY.

FLUID-PRESSURE BRAKE.

No. 852,526. Specification of Letters Patent. Patented May 7, 1907.

Application filed November 21, 1906. Serial No. 344,438.

*To all whom it may concern:*

Be it known that I, WILLIAM H. SAUVAGE, a citizen of the United States of America, and a resident of the borough of Manhattan, city, county, and State of New York, have invented certain new and useful Improvements in Fluid-Pressure Brakes, of which the following is a specification.

The invention disclosed comprises certain improvements on that shown in my reissued Letters Patent No. 12,229 dated June 7th, 1904.

The best form of apparatus embodying my invention at present known to me is illustrated in the accompanying drawings in which Figure 1 is a plan view of a portion of the usual freight car brake apparatus with my invention applied thereto, parts being broken away and the brakes being shown in release position. Fig. 2 is a similar view, the brakes being applied, and Fig. 3 is a detail section on line 3—3 of Fig. 2.

Throughout the drawings like reference figures indicate like parts.

1 is the auxiliary reservoir, 2 the usual cylinder having piston 4, hollow piston rod 6, push rod 11 and spring 32. One brake lever 8 is shown with a portion of tie rod 9 and of one top rod 10.

3 is a second or auxiliary cylinder having piston 5, hollow piston rod 7, spring 33 and push rod 12.

13 is a port in the side wall of cylinder 2 and so located as to be uncovered by piston 4 when it has traveled about 5½ inches.

14 is a port in the pressure head 15 of cylinder 3, connected to port 13 by pipe 16.

17 is a pin connecting hollow piston rod 7 of the second cylinder 3 with its push rod 12.

18 is a lever pivoted to a fixed fulcrum 19 on the car body at one end and at the other end to the push rod 12 by pin 22. A friction clutch composed of the rectangular frame 20 perforated at the ends for the passage of the rod 21 and having the perforated clutch dog 24, is pivoted to lever 18 by pin 23. The dog 24 is fulcrumed on the pin 25, and held in engagement by spiral spring 26 mounted on rod 21 and compressed between the dog and one end of the clutch frame. This forms a gripping device connecting the second piston to the brake rigging.

27 is a trip rod fastened at one end to the first piston rod 6, and passing through a perforation 28 in the tail of the dog 24. It has a stop 29 engaging the dog when the first piston is at its inmost position.

30 represents a hand brake crank on which is wound the chain 31, which may be connected to rod 21. A stop 34 may be placed on rod 21 to prevent excessive travel of piston 5 in case the clutch dog 24 should slip.

In operation the first cylinder and brake rigging operate in the usual manner except that the outward movement of the piston 4 sets the clutch dog 24. The rod 21 moves freely through said clutch on the out stroke of the piston but cannot be pulled back until the piston 4 has completed its return stroke and tripped the clutch through action of the stop 29, striking the tail of the clutch dog. When piston 4 passes port 13, air passes through pipe 16 to cylinder 3 and forces piston 5 out. This piston being connected to the brake rigging through push rod 12, lever 18, the clutch and rod 21, adds its force with double effect to the tension on the brake rigging. When the air is exhausted from the cylinders, piston 5 first comes home, and then the clutch holds rod 21 and the brake-rigging in that position until the first piston 4 completes its inward stroke and trips the clutch, when the push rod 11 telescopes back into the hollow piston rod 6 and the brakes come off completely. I find this slightly delayed final release an advantage on long trains as it tends to permit the cars to adjust themselves relative to one another before the brakes are completely released and so avoids breaking the train in two when releasing long trains at slow speeds.

The apparatus disclosed is particularly advantageous in its action in applying brakes in that the clutch is in full engagement before the second piston starts into action and so no lost motion of the second piston occurs, but it begins to do work the moment it moves. Also in case of such slack existing in the brake rigging as through wear of the brake shoes, causing the first piston to go nearly to the limit of its travel before sufficient air gets into the second cylinder to start the second piston into action, the clutch still takes hold on the bent movement of the second piston. The result is that the travel of the second piston rarely exceeds 3½ inches even though the first piston goes the whole length of its cylinder which gives it a travel of 12 inches.

Of course other forms of gripping devices or clutches could be used and other arrangements of levers, and the tripping connection to the first piston might be differently constructed.

Having, therefore, described my invention, I claim:

1. In a fluid pressure brake apparatus the combination with the usual cylinder, piston, and brake levers, of a second cylinder and piston, a lever having a fixed fulcrum at one end and pivoted to the second piston at the other, a friction clutch carried by said lever and a rod connected to the brake rigging and operatively engaged by said friction clutch.

2. A friction clutch device for use in brake rigging comprising the combination of a rectangular frame perforated at the ends, a rod passing through the perforations, a perforated clutch dog mounted in said frame and on said rod, a fulcrum for said dog mounted in the frame, and a spiral spring surrounding the rod and confined between the clutch dog and one end of the frame.

3. In a fluid pressure brake apparatus the combination with the usual cylinder, piston, and brake levers, of a second cylinder and piston, a lever having a fixed fulcrum at one end and pivoted to the second piston at the other, a friction clutch carried by said lever and a rod connected to the brake rigging and operatively engaged by said friction clutch; said friction clutch comprising a rectangular frame pivoted to the lever and perforated at the ends, a rod passing through the perforations, a perforated clutch dog mounted in said frame and on said rod, a fulcrum pin for said dog mounted in the frame, and a spiral spring surrounding the rod and confined between the clutch dog and one end of the frame.

4. In a fluid pressure brake apparatus the combination with the usual cylinder, piston and brake rigging, of a second cylinder and piston, means for bringing said second piston into action only after the movement of the first piston has begun, a friction clutch connecting said second piston with the brake rigging, and means for tripping said clutch operated by the return movement of the first piston.

5. In a fluid pressure brake apparatus, the combination with the usual cylinder, piston and brake levers, of a second cylinder and piston, a gripping device connecting said second piston with the brake rigging, and means for tripping said gripping device operated by the first piston, said means comprising a rod connected at one end to the first piston and having at its other end a stop adapted to engage the tail of the gripping device.

6. In a fluid pressure brake apparatus the combination with the usual cylinder, piston and brake rigging, the cylinder having a port in its side wall, of a second cylinder, a pipe extending from its pressure head to the port in the first cylinder, a piston in the second cylinder, and a friction clutch connecting the said second piston with the brake rigging, together with means for tripping said clutch operated by the movement of the first piston.

7. In a fluid pressure brake apparatus the combination with the usual cylinder, piston having a hollow piston rod, brake rigging and push rod connected thereto and telescoping into the hollow piston, of a second cylinder and piston, means for bringing said piston into action only after the movement of the first piston has begun, a friction clutch connecting said second piston with the brake rigging, and means for tripping said clutch operated by the return movement of the first piston.

8. In a fluid pressure brake apparatus the combination with the usual cylinder, piston having a hollow piston rod, brake rigging and push rod connected thereto and telescoping into the hollow piston, of a second cylinder and piston, means for bringing said second piston into action only after the movement of the first piston has begun, a friction clutch connecting said second piston with the brake rigging, and means for tripping said clutch operated by the return movement of the first piston, the mechanism through which the friction clutch effects the connection of the second piston to the brake rigging comprising a lever carrying the friction clutch pivoted to a fixed fulcrum at one end and to the second piston at the other end, and a rod sliding through said friction clutch and pivoted to one of the brake levers.

9. In a fluid pressure brake apparatus the combination with the usual cylinder, piston having a hollow piston rod, brake rigging and push rod connected thereto, and telescoping into the hollow piston, of a second cylinder and piston, means for bringing said second piston into action only after the movement of the first piston has begun, a friction clutch connecting said second piston with the brake rigging, and means for tripping said clutch operated by the return movement of the first piston, the mechanism through which the friction clutch effects the connection of the second piston to the brake rigging comprising a lever carrying the friction clutch pivoted to a fixed fulcrum at one end and to the second piston at the other end, and a rod sliding through said friction clutch and pivoted to one of the brake levers and the means for tripping the friction clutch comprising a rod connected to the hollow piston at one end and provided with a stop adapted to engage the tail of the clutch dog.

10. In a fluid pressure brake apparatus the combination with the usual cylinder, piston and brake rigging, of a second cylinder and piston, means operated by the movement of the first piston admitting fluid under pressure to the second cylinder, a friction clutch connecting said second piston with the brake rigging, and means for tripping said clutch operated by the return movement of the first piston.

11. In a fluid pressure brake apparatus the combination with two cylinders and pistons and brake rigging, of a friction clutch adapted to connect the second piston with the brake rigging at each heavy application of the brakes and means for tripping said friction clutch operated by the return movement of the first piston.

12. In a fluid pressure brake apparatus the combination with two cylinders, their pistons, brake rigging and means actuated by movement of the first piston to admit fluid under pressure into the second cylinder, of a clutch connecting the second piston to the brake rigging on the out stroke of said piston, and means for tripping said clutch operated by the return movement of the first piston.

13. In a fluid pressure brake apparatus the combination with the usual cylinder, piston and brake levers, of a second cylinder and piston, an adjustable gripping device connecting said second piston with the brake rigging, and means for setting said gripping device operated by the first piston.

Signed at New York, N. Y., this 19th day of November, 1906.

WILLIAM H. SAUVAGE.

Witnesses:
A. PARKER SMITH,
M. G. CRAWFORD.